(12) United States Patent
Narita

(10) Patent No.: US 8,439,092 B2
(45) Date of Patent: May 14, 2013

(54) TIRE TREAD SURFACE DESIGN

(75) Inventor: Nobutaka Narita, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 397 days.

(21) Appl. No.: 12/680,646

(22) PCT Filed: Sep. 29, 2008

(86) PCT No.: PCT/EP2008/063027
§ 371 (c)(1),
(2), (4) Date: Apr. 21, 2010

(87) PCT Pub. No.: WO2009/040439
PCT Pub. Date: Apr. 2, 2009

(65) Prior Publication Data
US 2010/0200137 A1    Aug. 12, 2010

(30) Foreign Application Priority Data
Sep. 27, 2007   (FR) ..................................... 07 06857

(51) Int. Cl.
*B60C 11/03* (2006.01)
*B60C 11/117* (2006.01)

(52) U.S. Cl.
USPC ............................... 152/209.15; 152/209.17

(58) Field of Classification Search ............. 152/209.15, 152/209.17
See application file for complete search history.

(56) References Cited

U.S. PATENT DOCUMENTS

D157,437 S  *  2/1950  Salcy .......................... D12/577

FOREIGN PATENT DOCUMENTS

| FR | 650 283 | | 1/1929 |
| GB | 546975 | * | 8/1942 |
| JP | 10-272905 A | | 10/1998 |

OTHER PUBLICATIONS

English machine translation of JP10-272905, Oct. 1998.*
International Search Report (PCT/ISA/210) dated Nov. 24, 2008.

* cited by examiner

*Primary Examiner* — Richard Crispino
*Assistant Examiner* — Robert Dye
(74) *Attorney, Agent, or Firm* — Buchanan Ingersoll & Rooney PC

(57) ABSTRACT

A tire tread provided with a plurality of grooves delimiting blocks and/or ribs and having an average depth H. This tread has a tread surface designed to come into contact with the roadway only along a plurality of raised contact lines. The raised contact lines intersect one another to delimit, on the tread surface, a plurality of contiguous first cavities each formed by a wall which is recessed radially inwardly from the tread surface. The walls of the first cavities are intersected by respective second cavities situated radially.

9 Claims, 2 Drawing Sheets

TIRE TREAD SURFACE DESIGN

BACKGROUND

The field of the invention is that of passenger vehicle tire treads and more specifically the design of the rolling surface of such treads.

Winter driving on roads covered with snow and ice requires a tread that has a great many ridges and recesses in order to promote better grip by storing and/or clearing the fluid or solid particles present on these roads.

Clearing means that the fluid or solid particles are drained away from direct contact between the tread and the roadway so that the material of which the tread is made is in direct contact with the roadway.

While it is possible to use means that allow this drainage to be performed once the tire has undergone an initial degree of wear (particularly once cavities initially present within the tread have reached the tread surface), it has been found that before it reaches this initial degree of wear, a tread may exhibit inferior performance.

The object of the invention is therefore to provide a technical solution to the problem of insufficient grip ("grip" being the accepted English term for adhesion) in the first few kilometers of running with a new tread.

SUMMARY

To this end, the tire tread according to the invention is provided with a plurality of grooves delimiting blocks and/or ribs, these grooves having an average depth H. This tread has a surface radially on the outside of which part forms a tread surface designed to come into contact with the roadway during rolling. This tread surface is characterized in that it is in contact with the roadway only along a plurality of contact raised lines, these contact raised lines intersecting one another to delimit, on the tread surface a plurality of small cavities, that is to say of parts situated radially on the inside of the said tread surface. These cavities which are recessed with respect to the tread surface significantly increase the contact pressure along the contact lines. This encourages the clearing of loose particles present on the roadway towards the cavities and is therefore beneficial to ensuring contact between the tire and the roadway.

Advantageously, the contact raised lines are organized into a plurality of first contact lines and a plurality of second contact lines, the first contact raised lines being directed substantially in a first direction, the second contact raised lines being directed substantially in a second direction. The first contact raised lines intersect the second contact raised lines to form, on the tread surface, at the intersection with the said tread surface, first cavities, each first cavity being delimited in the thickness of the tread by a main wall. In this alternative form of the invention, the first and the second contact lines may follow paths which are either rectilinear or non-rectilinear. What is essential is that the tread be in contact, at least at light loads, only along the contact lines, all the other points of the surface of the tread being radially offset towards the inside (that is to say towards the axis of rotation of the tire fitted with the tread) in order to increase the contact pressure on these lines and thus be able to direct any loose particles present on the roadway towards the cavities.

For preference, the largest dimension of the first cavities on the tread surface is at least equal to 0.2 mm and at most equal to 1.5 mm for a tire intended to be fitted to a passenger vehicle.

Advantageously, the maximum depths of the first cavities are at most equal to 10% of the depth of the grooves.

According to an improvement of this invention, the tread according to the invention may further comprise a plurality of second cavities of depth P2, each second cavity opening onto the main wall delimiting a first cavity, this second cavity being delimited by a second wall.

In the latter alternative form, the sum of the depths of the first and second cavities is at most equal to 20% of the depth H of the grooves. Thus it becomes possible to create an initial volume suited to capturing the particles present on the roadway without in any way adversely affecting the rigidity of the tread.

In order not to cause too much disruption to the rigidity of the tread near the tread surface, it is sensible for the projected area of the surface delimiting each second cavity onto the tread surface to be at least equal to 10% and at most equal to 40% of the projected area of the first cavities onto the tread surface.

It is also sensible for the intersection between the wall delimiting the second cavity and the main wall of the first cavity to be a closed geometric line the length of which differs from the length of the geometric line of intersection of the first cavity with the tread surface.

Advantageously, the second cavities have dimensions suited to containing a spherical body of a diameter of 0.2 mm.

BRIEF DESCRIPTION OF DRAWINGS

Other features and advantages of the invention will emerge from the description given hereinafter with reference to the attached drawings which, by way of nonlimiting examples, show some embodiments of the subject matter of the invention.

To make the figures and the associated description easier to understand, the same references are used to denote identical structural elements irrespective of the alternative form of embodiment considered.

DETAILED DESCRIPTION OF PREFERRED EMBODIMENTS

Figure 1:
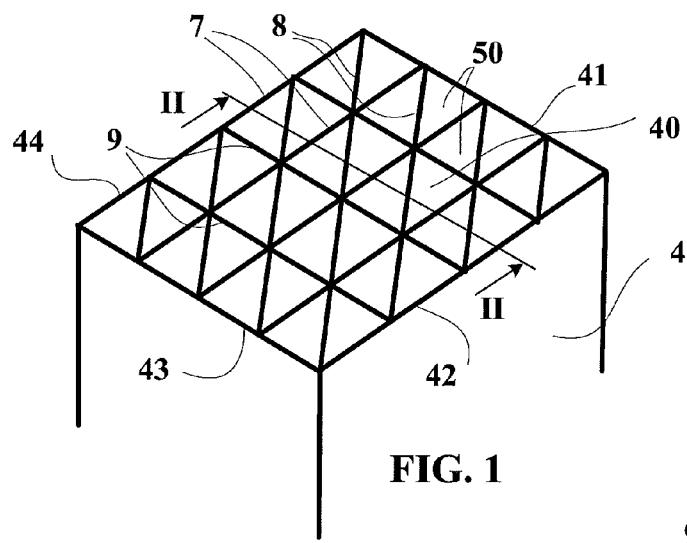
FIG. 1 shows part of a tread surface of a tread according to the invention, intended for a passenger vehicle tire.

FIG. 1 shows the contact face 40 of a tread element 4 of rectangular shape delimited by ridges 41, 42, 43 and 44, this contact face being intended to come into contact with the roadway during running.

This contact face comprises a plurality of raised contact lines, this plurality being made up of three series of contact lines 7, 8, 9 respectively parallel to three different directions, two of these directions being parallel to the ridges of the tread element.

These contact lines 7, 8, 9 intersect one another in such a way as to delimit surface portions of substantially triangular shape. Furthermore, in each of the said triangles and with the exception of the points of the contact lines, all the other points are set back from the plane surface passing through the sides of the said triangle so as to form kinds of small cavities 50. In this way, a kind of partition of the external surface of the block 4 is created whereby all the points on this surface, with the exception of the points of contact lines, are offset towards the inside of the tread. Thus, during running, this element comes into contact along its contact raised lines, and then along part or even all of the surfaces of cavities formed, as will be explained more specifically in connection with FIGS. 4-6.

It is essential that, on the external face of each element of a tread intended to come into contact with the roadway, there should be no contact surface other than the contact lines (in particular it is recommended that the formation of flaps on the contact lines be avoided), in order to enjoy the full technical benefit of the invention.

Figure 2:
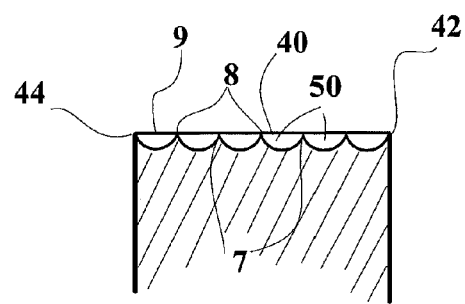
FIG. 2 shows a section on II-II of FIG. 2.
Figure 3:
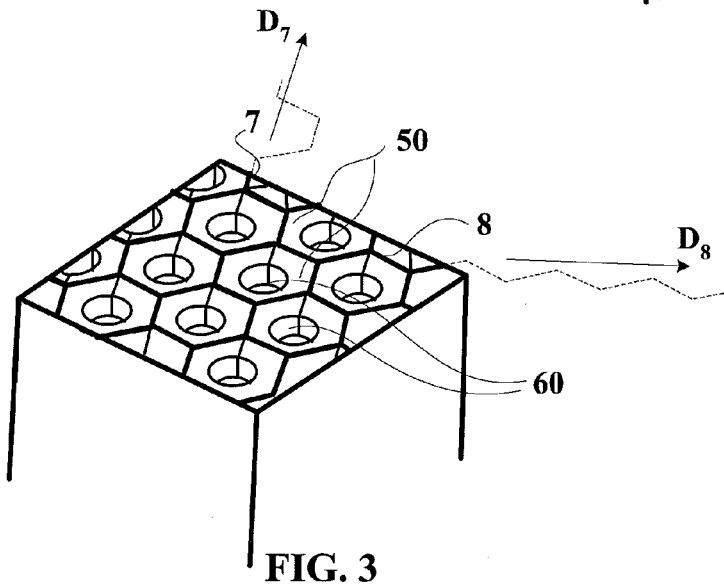
FIG. 3 shows another alternative form of tread according to the invention.

FIG. 2 shows a sectioned view of the tread element of FIG. 1, this section being taken along the section line II-II. This cross section shows that the contact face 40 of the tread element comprises a plurality of cavities 50 opening to the outside of the tread and delimited on the outside by the contact lines 7, 8, 9. The depth of the cavities here is 0.2 mm and the max length of the sides delimiting each cavity on the tread surface here is of the order of 1.0 mm In the alternative form of the invention shown by FIG. 3, the exterior face of a tread element comprises a plurality of first cavities 50 delimited by raised contact lines 7 and 8. This exterior face comprises a first plurality 7 of raised contact lines with non-rectilinear paths and a second plurality 8 of raised contact lines with non-rectilinear paths. Each of the contact lines 7 of the first plurality of lines is directed in the first direction $D_7$. Each of the lines of the second plurality of contact lines 8 is directed in a second direction $D_8$. Aside from the first cavities 50 that open onto the contact face, there are second cavities 60 of cylindrical shape and which open onto the wall delimiting the first cavities 50. These second cavities are formed to create a kind of reservoir in which the loose particles on the roadway can be temporarily collected. The total depth of a first and of a second cavity in this instance is equal to 1 mm. The fact that the contact pressures generated on the contact lines 7 and 8 are increased in comparison with the other points of the first cavities allows the loose particles to be directed towards the first and second cavities. In the case of the prior art, the fact that there were contact surfaces rather than contact lines made it impossible to direct the said loose particles towards the cavities, and this resulted in a loss of contact with the roadway.

Figure 4:
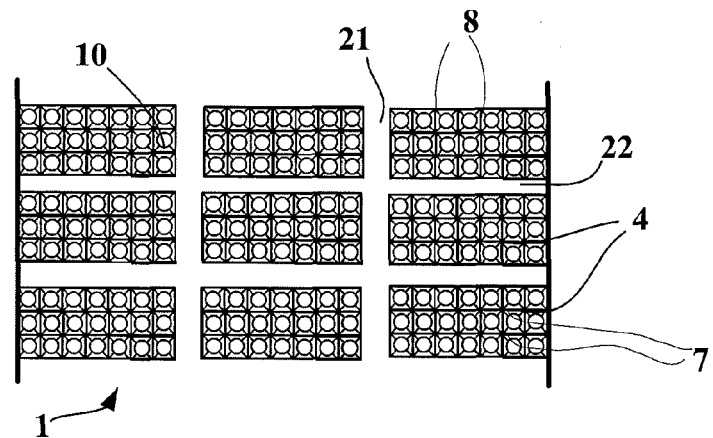
FIG. 4 shows the tread surface of a tread according to the invention intended for a passenger vehicle tire.
Figure 5:
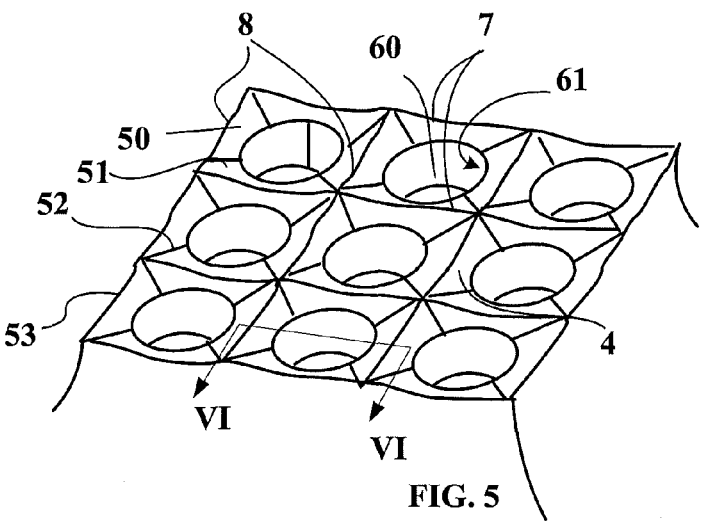
FIG. 5 shows an enlarged local view of the tread shown in FIG. 4.
Figure 6:
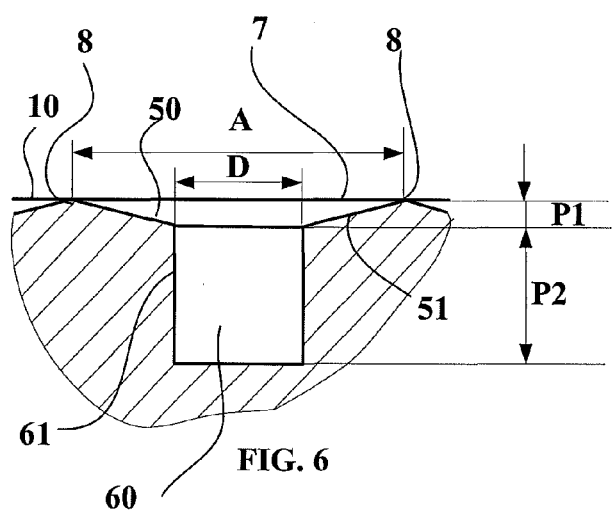
FIG. 6 shows a section on VI-VI of FIG. 5.

FIGS. 4-6 show an alternative form of the invention forming the tread surface 10 of a passenger car tire tread 1. This tread 1 comprises a plurality of longitudinal 21 and transverse 22 grooves delimiting tread pattern blocks 4 of which one of the surfaces directed towards the outside of the tread forms part of the tread surface 10 of the said tread.

These grooves have an average height H equal in this instance to 5 mm.

Furthermore, in the as-new state of this tread 1 and on each tread pattern block 4, a plurality of first cavities 50 opening onto the exterior surface of the said block has been molded, each first cavity 50 being extended towards the inside of the tread by a second cavity 60. The intersections of the first cavities with the tread surface of the tread follow lines of contact 7 and 8, all the other points of the main surfaces of the first cavities being situated towards the inside relative to the said lines of contact. In this way, the tread surface comes into contact with the roadway along the lines of contact 7 and 8 first; thereafter, contact may be had over at least some of the main walls of the main cavities or even over the entirety thereof. What is essential is that initially, contact established along the lines of contact, generates forces that drive any loose particles present on the roadway towards the inside of the first cavities.

FIG. 5 shows an enlarged view of part of a block 4 of such a tread, and reveals a plurality of the first cavities 50 and the second cavities 60.

As shown by FIG. 6 which is a section on VI-VI of FIG. 5, each first cavity 50 of depth P1 (equal to 0.1 mm) is delimited by a main wall 51 which, in this instance, has the overall shape of a truncated pyramid. The lines 52 along which the faces of the said pyramid intersect make an angle of 12° with the tread surface. The main wall 51 of this first cavity 50 intersects the tread surface 10 along a geometric line 53 of closed contour of total length C1. This geometric line 53 is formed of portions of first and second lines of contact 7, 8 and is able to apply a force that causes the tire to engage with the roadway and with the materials covering the roadway (such as snow). This geometric line 53 formed by the intersection of the main wall 51 of the first cavity 50 with the tread surface 10 has a substantially square shape with a side length A equal in this instance to 1.2 mm.

The first cavities 50 are formed in such a way as to be contiguous with one another on each tread pattern block 4 ("contiguous" here means that part of a line of contact of a first cavity is also part of a line of contact of another first cavity). Thanks to this arrangement, it is possible to improve the efficiency with which particles on the roadway are collected and thus improve the efficiency of the ridges in contact with the road surface. In this instance, one side of a first square is also a side of square adjacent to the first square.

The purpose of the first cavity 50 is to increase the pressure loading on the line of contact in contact with the road surface while at the same time capturing the loose particles present on the road surface and directing them towards the bottom of the said first cavity.

Furthermore, each first cavity 50 is extended within the thickness of the tread by a second cavity 60, of depth P2, in this instance equal to 0.4 mm, opening onto the main wall 51 of the first cavity 50. This second cavity 60, which acts as a reservoir for the loose particles, is delimited by a wall 61 which intersects the main wall 51 of the first cavity 50 along a circular line of closed contour the length C2 of which is shorter than the length C1 of the line of intersection 53 between the first cavity and the tread surface 10.

In this instance, the second cavity 60 is of cylindrical circular shape with a diameter D equal to 0.8 mm and opens onto the bottom end of a first cavity 50. The total depth (the sum of the depths P1 and P2) of the first and second cavities is equal to 0.4 mm.

In order to optimize the collection of particles and their temporary storage during transient contact with the road surface, it is recommended that the choice of total volume of first and second cavities per unit area on the tread surface be at least equal to 5 cubic millimeters (5 mm$^3$). This then gives enough first cavities that the loose particles can be drained away to the reservoirs formed by the second cavities.

For preference, the second cavities have any shape of appropriate size that they can contain at least one spherical body of a diameter equal to 0.2 millimeters.

The invention is not restricted to the examples described and depicted and various modifications can be made thereto without departing from its scope.

The invention claimed is:

1. Tire tread provided with a plurality of grooves delimiting blocks and/or ribs, these grooves having an average depth H, this tread having a radially exterior surface, part of which forms a tread surface designed to come into contact with the roadway during rolling, this tread surface comprising a plurality of first raised contact lines and a plurality of second raised contact lines, the first raised contact lines being geometric lines or edges directed substantially in a first direction, the second raised contact lines being geometric lines or edges directed substantially in a different, second direction, the first raised contact lines intersecting the second raised contact lines to delimit, on the tread surface, a plurality of contiguous first cavities each delimited in the thickness of the tread by a main wall, all the points of the main wall, except for the points of the raised contact lines, being situated radially inwardly of the tread surface, wherein during running of the tire in the as-new state, the radially exterior surface of the tread is first in contact with the roadway only along the plurality of raised contact lines, this tread further comprising a plurality of second cavities each delimited by a secondary wall opening onto said main wall of a respective first cavity.

2. Tread according to claim 1, wherein the sum of a depth of the first cavity and a depth of the second cavity is at most equal to 20% of the average depth H of the grooves.

3. Tread according to claim 2 wherein the projected area of each second cavity onto the exterior surface is at least equal to 10% and at most equal to 40% of the projected area of each of the first cavities onto the tread surface.

4. Tread according to claim 1, wherein each of the second cavities has a dimension sized to containing a spherical body of a diameter of 0.2 mm.

5. Tread according to claim 1, wherein the largest dimension of the first cavities on the tread surface is at least equal to 0.2 mm and at most equal to 1.5 mm.

6. Tread according to claim 1, wherein the maximum depth of the first cavities is at most equal to 10% of the depth of the grooves.

7. Tread according to claim 1, wherein the first cavities have a shorter depth than the second cavities.

8. Tread according to claim 1, wherein the second cavities intersect the walls of the first cavities at radially innermost portions of the first cavities.

9. Tread according to claim 1, wherein the walls of the first cavities extend in non-radial directions.

\* \* \* \* \*